United States Patent [19]

Hsiung

[11] 4,261,665
[45] Apr. 14, 1981

[54] WOODEN MEMBERS ASSEMBLY

[76] Inventor: George S. J. Hsiung, 52, Lane 58, Ming-An West Rd., Hsin-Chuang Cheng, Taipei Hsien, Taiwan

[21] Appl. No.: 65,283

[22] Filed: Aug. 9, 1979

[51] Int. Cl.³ .............................................. F16B 9/00
[52] U.S. Cl. ..................................... 403/231; 403/217; 403/219; 403/254; 403/258; 403/260
[58] Field of Search ............... 403/231, 254, 255, 258, 403/260, 217, 219

[56] References Cited

U.S. PATENT DOCUMENTS

| | | | |
|---|---|---|---|
| 3,071,399 | 1/1963 | Cronin | 403/219 |
| 3,835,610 | 9/1974 | Harper et al. | 403/231 X |
| 3,845,604 | 11/1974 | Ottosson | 403/231 X |
| 4,008,971 | 2/1977 | Wah et al. | 403/260 X |
| 4,169,573 | 10/1979 | Frieberg | 403/217 X |

FOREIGN PATENT DOCUMENTS 628680  7/1927  France ................................. 403/217

Primary Examiner—James Kee Chi

[57] ABSTRACT

A set of wooden members assembly comprises a plurality of elongated pillar members having a number of grooves provided on the peripheral surface thereof for receiving the tongues of spar members, each of the grooves being provided with a through hole therein for receiving a screw bolt; a plurality of first elongated spar members having a bushing provided therein separately; and a plurality of second elongated spar members each having a radial through hole provided at an end thereof. One may easily assemble these members to form a certain object by inserting a screw bolt from outside of the through hole of the pillar member through the radial through hole of the second spar member to engage with the bushing provided within the first spar member.

2 Claims, 7 Drawing Figures

WOODEN MEMBERS ASSEMBLY

BACKGROUND OF THE INVENTION

1. Field of the Invention

This invention relates to sets of wooden members assembly comprising a plurality of elongated pillar members and spar members. Any one can readily assemble these members to form a certain object such as chair, table, cabinet or the like.

2. Description of the Prior Art

Assembling constructions of most of the conventional wooden objects such as furniture is complicatedly completed by jointing grooves and tongues provided integrally on the wooden members which constitute the whole wooden object. Since each of the wooden members must meet the requirements of the buyer's order, it is difficult to manufacture in a large scale. Furthermore, it is not easy to detach the conventional assembled wooden objects in order to save package space or transportation space. Also, in the disassembling process, the wooden members would be, more or less, damaged, and the reliability of the reassembled wooden object is not as steady as that of the originallyassembled wooden object. Accordingly, if someone wants to detach the conventional wooden objects in order to save the package space or the transportation fee, he will be, undoubtedly, dissapointed by the above-mentioned disadvantages of the prior wooden objects. Generally speaking, the requirements of the furniture for the public are good appearance, comfort and reasonable price, and the furniture manufacturers are still searching for a new kind of furniture which not only meets the public's requirements but also reduces production cost, skilled labor, transportation space, etc. Therefore, detachability is one of the most important requirements of the furniture to the manufacturers.

BRIEF SUMMARY OF THE INVENTION

It is an object of the present invention to provide sets of wooden members assembly which can be assembled easily to form a certain object without requiring any special skills and detached readily to put into a package box for minimizing the transportation space.

It is another object of the present invention to provide novel sets of wooden members assembly which permits considerable reliability of re-assembled construction.

It is still another object of the present invention to provide sets of wooden members assembly comprising a plurality of elongated members which can be produced in large quantity and, then, cut into a desired size to meet the actual needs.

In accordance with the present invention, there is provided sets of wooden members assembly comprising a plurality of elongated pillar members with a number of grooves provided on the peripheral surface thereof, each of the grooves being provided with a radial through hole therein for receiving a screw bolt; a plurality of first elongated spar members each having a longitudinal recess hole provided therein for receiving a bushing and a radial recess hole crossing through the longitudinal recess hole for receiving a pin, the bushing being provided with female threads therein and two opposite radial openings on lower portion thereof, the opposite radial openings of the bushing provided in the longitudinal recess hole being aligned with the radial recess hole so as to permit insertion of a pin; a plurality of second elongated spar members of which one end being provided with a planer surface acting as a tongue and adapted to attach to the cross sectional surface of one end of the first elongated spar member, the planar surface having a radial through hole capable of aligning with the through hole of the elongated pillar member and the bushing positioned in the first elongated spar member; whereby one may assemble readily these members to form a certain object by using a few bolts and pins.

BRIEF DESCRIPTION OF THE DRAWINGS

These and other objects, advantages, features, and uses will become more apparent as the description proceeds, when considered with the accompanying drawings in which.

DETAILED DESCRIPTION OF THE PREFERRED EMBODIMENTS

Figure 1:
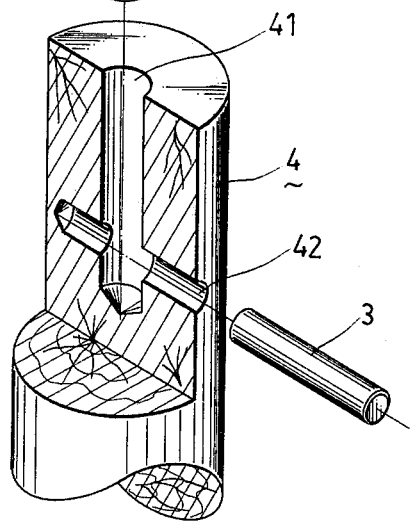
FIG. 1 ia a partially perspective exploded view of the first elongated spar member of the present invention.

Referring first to FIG. 1, there is shown a partially perspective exploded view of a first elongated spar member 4 of the present invention which includes an elongated cylindrical body having a longitudinal recess hole 41 extending inwardly from the central portion of the cross sectional surface thereof and a radial recess hole 42 extending inwardly from a position of the peripheral surface thereof and crossing perpendicularly through the longitudinal recess hole 41, a bushing 1 provided with female threads 12 therein and two opposite radial openings 11a, 11b whose diameter is larger than or equal to the diameter of the radial recess hole 42, a screw bolt 2 having external threads thereon to engage with the bushing 1, and a pin 3 whose outer diameter is slightly smaller than or equal to the diameter of the radial recess hole 42. When the bushing 1 is placed in the longitudinal recess hole 41 of the cylindrical body, the opposing radial openings 11a, 11b of the bushing 1 are aligned with the radial recess hole 42 of the cylindrical body so as to fix the bushing 1 within the longitudinal recess hole 41 by inserting the pin 3 in the radial recess hole 42 and across the opposite radial openings 11a, 11b of the bushing 1. The length of the screw bolt 2 is so designed that the tip end thereof will not attach to the pin 3 crossing through the radial opposite openings 11a, 11b of the bushing 1 when the screw bolt 2 is screwed tightly with the bushing 1.

Figure 2:
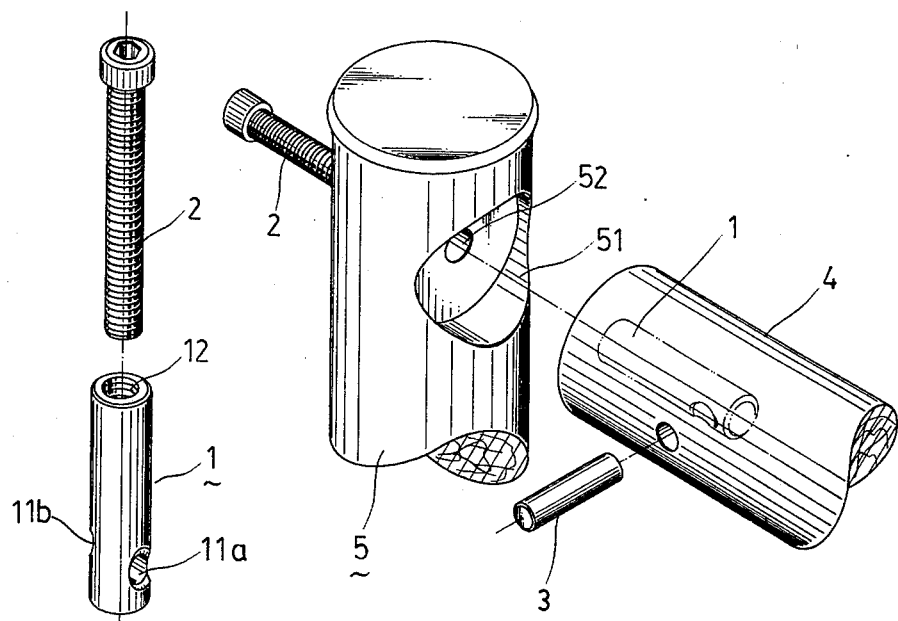
FIG. 2 is a partially perspective exploded view of an embodiment of the present invention illustrating the assembling relations between the first elongated spar members and the elongated pillar members.
Figure 3:
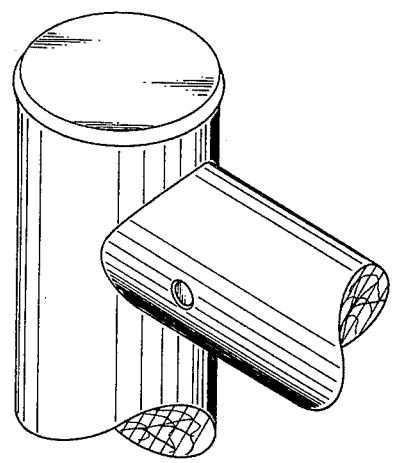
FIG. 3 is a perspective view of the embodiment illustrated in FIG. 2.

Referring now to FIGS. 2 and 3, there are shown an exploded and a partially perspective views of an embodiment of the present invention which comprises an elongated pillar member 5 having a number of circular grooves 51 provided on the peripheral surface thereof (only one circular groove provided on the pillar member is shown in FIG. 2) and an above-described first elongated spar member 4. At the central portion of each said circular groove 51 is provided with a radial through hole 52 whose diameter is slightly larger than that of the screw bolt 2. The diameter of the circular grooves 51 is equal to the outer diameter of the first elongated spar member 4 so that they may joggle together. By putting the bolt 2 and one end of the first elongated spar member 4 into the circular groove 51, one can assemble a certain object readily (best shown in FIG. 3).

Figure 4:
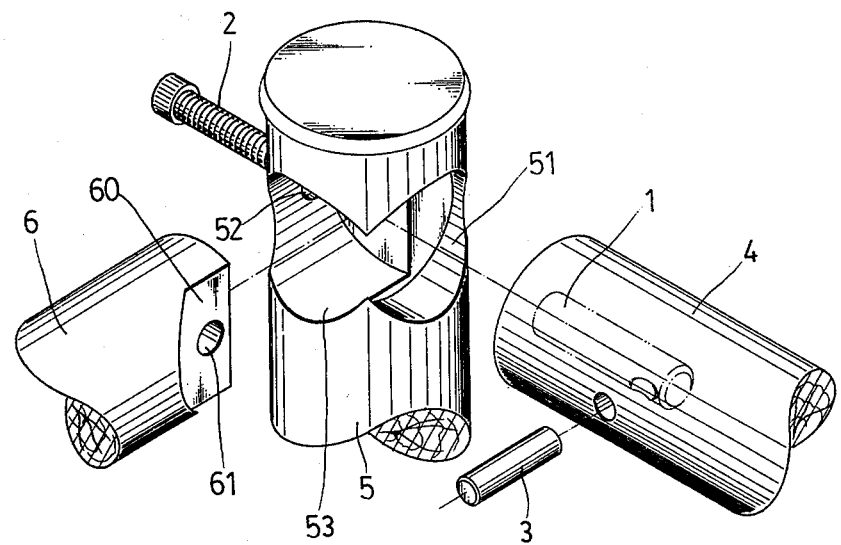
FIG. 4 is a partially perspective exploded view of a second embodiment of the present invention illustrating the assembling relations among the elongated pillar members, the first and second elongated spar members.
Figure 5:
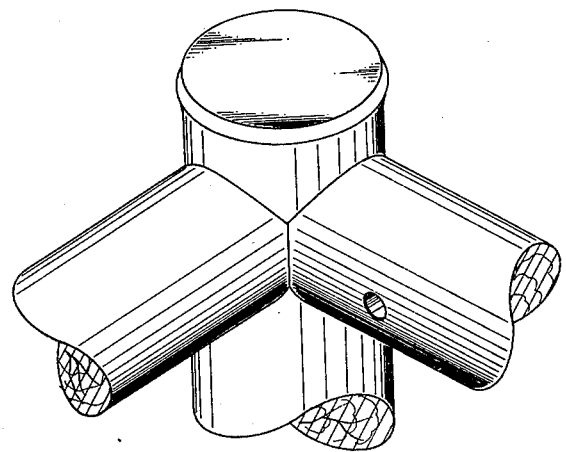
FIG. 5 is a perspective view of the second embodiment illustrated in FIG. 4.

FIGS. 4 and 5 show a partially perspective view of a second embodiment in accordance with the present invention which comprises the previously described elongated pillar member 5 and first elongated spar member 4, and a second elongated spar member 6 having a cylindrical body having a partial planar surface 60 acting as a tongue positioned at one end thereof and a radial through hole 61 extending inwardly from the central portion of the planer surface 60 thereof. The elongated pillar member 5, however, is further provided with a circular groove 53 which is communicated with the first circular groove 51 as shown in FIG. 4. The diameter of the radial through hole 61 of the second elongated spar member 6 is larger than or equal to the diameter of the radial through hole 52 of the elongated pillar member 5. When the engaging ends of the first and second elongated spar members 4, 6 are put into the circular grooves 51, 53 of the elongated pillar member 5 respectively, the radial through hole 61 of the second elongated spar member 6 is placed in alignment between the through hole 52 of the elongated pillar member 5 and the bushing 1 positioned within the first elongated spar member 4. Such that one may insert easily the screw bolt 2 from the outside of the radial through hole 52 through the radial through hole 61 of the second elongated spar member 6 and into the bushing 1 and have it screwed therewith (best shown in FIG. 5).

Figure 6:
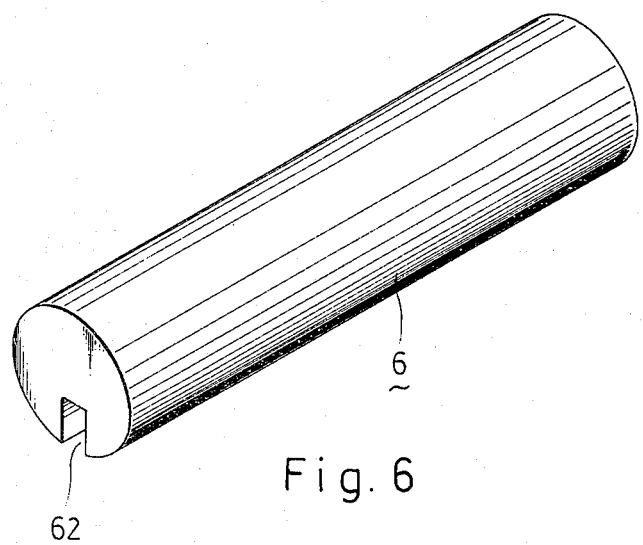
FIG. 6 is a partially perspective view of an embodiment of the first or second elongated spar members in accordance with the present invention.
Figure 7:
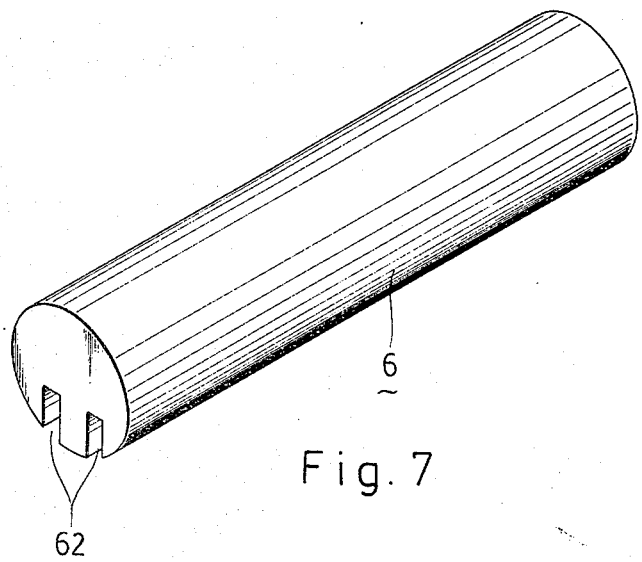
FIG. 7 is a partially perspective view of a second embodiment of the first or second elongated spar members in accordance with the present invention.

FIGS. 6 and 7 show a partially perspective view of two different embodiments of the first or second elongated spar members 4, 6 separately in which one or more longitudinal groove 62 provided on one end thereof extends in the longitudinal direction to receive a face plate or a piece of glass acting as a movable door or window of the assembled wooden object.

It should be expressly understood that the embodiments described previously are in no way intended to limit the scope of the present invention. Numerous modifications can be made within the scope of the appended claims.

What is claimed is:

1. A set of wooden members assembly comprising: a plurality of elongated pillar members having a number of grooves provided on the peripheral surface thereof, each of said grooves being provided with a radial through hole therein for receiving a screw bolt; a plurality of first elongated spar members having a longitudinal recess hole extending inwardly form one end thereof to receive a bushing, and a radial recess hole extending inwardly from a position of the peripheral surface thereof and crossing through said longitudinal recess hole to receive a pin, said bushing having female threads therein and two opposite radial openings at its lower portion, the opposing radial openings of said bushing provided in said longitudinal recess hole being aligned with said radial recess hole so that the pin may be inserted in said radial recess hole and fixed thereto; a plurality of second elongated spar members of which one end being provided with a partial planar surface acting as a tongue and adapted to attach to the cross sectional surface of one end of said first elongated spar members, said partial planer surface having a radial through hole to be aligned with the radial through hole of said elongated pillar members and said bushing provided in said first elongated spar members; whereby one may assemble readily these members to form a certain object by using a few screw bolts and pins.

2. A set of wooden members assembly as claimed in claim 1, wherein said first or second elongated spar members may further be provided with one or more longitudinal groove at the outer surface thereof so as to receive a face plate or a piece of glass acting as a movable door or window of the assembled wooden objects.

* * * * *